United States Patent
Kulkarni et al.

(10) Patent No.: US 6,800,272 B2
(45) Date of Patent: Oct. 5, 2004

(54) PROCESS FOR THE PREPARATION OF ZSM-5 CATALYST

(75) Inventors: Shivanand Janardan Kulkarni, Andhra Pradesh (IN); Srinivasu Pavuuri, Andhra Pradesh (IN); Narender Nama, Andhra Pradesh (IN); Kondapuram Vijay Raghavan, Andhra Pradesh (IN)

(73) Assignee: Council of Scientific and Industrial Research, New Delhi (IN)

(*) Notice: Subject to any disclaimer, the term of this patent is extended or adjusted under 35 U.S.C. 154(b) by 20 days.

(21) Appl. No.: 10/095,429

(22) Filed: Mar. 13, 2002

(65) Prior Publication Data

US 2003/0223932 A1 Dec. 4, 2003

(51) Int. Cl.$^7$ ............................................ C01B 39/40
(52) U.S. Cl. ................. 423/707; 423/709; 423/DIG. 22
(58) Field of Search ............................... 423/705, 707, 423/709, DIG. 22, 700

(56) References Cited

U.S. PATENT DOCUMENTS

| | | | | | |
|---|---|---|---|---|---|
| 3,702,886 | A | * | 11/1972 | Argauer et al. | ............. 423/705 |
| 4,199,556 | A | * | 4/1980 | Plank et al. | ................ 423/701 |
| 4,606,900 | A | * | 8/1986 | Kacirek et al. | ............. 423/709 |
| 5,102,644 | A | * | 4/1992 | Plank et al. | ................ 423/700 |
| 5,365,002 | A | * | 11/1994 | Wallau et al. | .............. 585/418 |
| 2003/0170172 | A1 | * | 9/2003 | Ludvig | ....................... 423/709 |

\* cited by examiner

*Primary Examiner*—David Sample
(74) *Attorney, Agent, or Firm*—Burns, Doane, Swecker & Mathis, L.L.P.

(57) ABSTRACT

The present invention provides an improved process for the preparation of ZSM-5 catalyst of the formula 3.25 $Na_2O.Al_2O_3.30SiO_2.zH_2O$ where z=15–20 water molecules per unit cell by autoclaving a mixture of a pre-prepared seeding gel comprising a mixture of a alkali metal cation, an alkali hydroxide, and a silica source in water, and further amounts of silica source and an aluminium source in the presence of an organic solvent with water as a co-solvent.

16 Claims, No Drawings

PROCESS FOR THE PREPARATION OF ZSM-5 CATALYST

FIELD OF THE INVENTION

The present invention relates to an improved process for the preparation of crystalline ZSM-5 pentasil type of zeolite like ZSM-5 (Zeolite Socony Mobil-5), which are useful in acid catalyzed reactions.

BACKGROUND OF THE INVENTION

The synthesis of ZSM-5 is reported in U.S. Pat. No. 3,702,886 (1972). In the presently known processes ZSM-5 was synthesized from a mixture of alkali metal cation, especially sodium, tetra alkyl ammonium cation, aluminum source like sodium aluminate, silica source like sodium silicate and water in the pH range of 6.7 to 13.0, the autoclavation temperature of 120°–200° C. under autogeneous pressure. The ZSM-5 material showed characteristic X-ray diffraction pattern. The ZSM-5 catalyst was initially prepared within eight days, typically at 150° C. for six days. There are various attempts to reduce the time of the autoclavation from six days to two days by seeding gel method (Microporous Materials 22, 626–627 (1998). The attempts have been made to reduce the autoclavation time by using anionic promoters like $H_3PO_4$ (Nature, 381, 298 (1996)) and by varying ratios of various precursors (Zeolites 12, 943 (1992)). Many other patents have been reported in the literature. These methods have some limitations and cannot be commercialized. The limitations are (1) X-ray crystalline purity, (2) crystalline phase purity (3) the promoter cation enters into tetrahedral position like the arsenate promoter leads to arsanate-silicalite with different catalytic properties. (4) The definite Si/Al ratio in the gel and the product (5) product yield.

OBJECTS OF THE INVENTION

Accordingly it is an object of the invention to provide a process for the preparation of ZSM-5 catalyst which is commercially feasible.

It is another object of the invention, to provide a process for the preparation of ZSM-5 catalyst which shows high X-ray and crystalline phase purity and specific Si/Al ratios.

It is a further object of the invention to provide a process for the preparation of ZSM-5 catalyst which provides a high product yield in short autoclavation time.

SUMMARY OF THE INVENTION

The present invention relates to the improved synthesis of uniform porous, crystalline zeolitic material similar to ZSM-5 a member of pentasil family. ZSM-5 has a characteristic X-ray diffraction pattern. The typical chemical composition of ZSM-5 may be represented as $3.25\ Na_2O: Al_2O_3: 30\ SiO_2: \sim 958\ H_2O$.

Accordingly the present invention provides an improved process for the preparation of ZSM-5 catalyst of the formula $3.25\ Na_2O.\ Al_2O_3.30SiO_2.zH_2O$ where $z=15–20$ water molecules per unit cell, and XRD pattern as given in Table 1 below comprising autoclaving a mixture of a pre-prepared seeding gel comprising a mixture of a alkali metal cation, an alkali hydroxide, and a silica source in water, and further amounts of silica source and an aluminium source in the presence of an organic solvent near or above the super critical conditions of temperature and pressure for the said organic solvent.

In one embodiment of the invention, the alkali metal cation comprises sodium tetraalkyl ammonium cation.

In a further embodiment of the invention, the silica source comprises tetraethoxysilane.

In another embodiment of the invention, the aluminium source is sodium aluinate.

In one embodiment of the invention, the organic solvent used is selected from the group consisting of methanol, acetone, isopropanol, acetonitrile and ethanol.

In another embodiment of the invention, water is used as a co-solvent along with the organic solvent.

In a further embodiment of the invention, the autoclavation temperature is varied from 150 to 250° C., preferably under supercritical temperature of organic solvent.

In yet another embodiment of the invention, the autoclavation pressure is varied from 20 to 50 atm near to sub-critical and supercritical pressure of the organic solvent used.

In another embodiment of the invention, the Si/Al atomic ratio in the seeding gel is varied thereby controlling the Si/Al atomic ratio in the as synthesized ZSM-5.

In a preferred embodiment the Si/Al ratio can be varied in the range of 10 to 60. ZSM-5 is highly thermally stable. The organic template was removed by heating as-synthesized ZSM-5 at 550° C. for 12–16 hours.

DETAILED DESCRIPTION OF THE INVENTION

The seeding gel was used in the initial gel. The seeding gel was typically prepared as follows: 0.6 g (0.01725 mole) of sodium hydroxide was dissolved in 71.028 ml (3.946 mole) of distilled water. 27.7Ml (0.02875 mole) of tetrapropylammonium hydroxide was added dropwise to NaOH solution with stirring. The mixture was stirred for 30 min. Then 27.5 ml (0.1322 mole) of tetraethoxysilane was added dropwise. The total mixture was stirred at 100° C. for about 16 h. This mixture was used as seeding gel. The ZSM-5 was synthesized as follows: Sodium hydroxide of 0.88 g (0.22 mole) was dissolved in distilled water. Sodium aluminate of 1.05 g (0.0128 mole) and 196 ml (4.841 mole) of methanol as a solvent were added and the mixture was stirred for 30 min. Tetraethoxysilane of 41.9 ml (0.1882 mole) was added dropwise and stirred for an hour. Finally 15 g of the seeding gel was added and the mixture was stirred for 1 h. The initial pH of the mixture was 10.2–11.0. The total mixture was put into 600 ml Parr autoclave and stirred at 230°–250° C. for 4–10 h. The solid product was filtered, washed with distilled water and dried at 100–110° C. for 6 h.

The organic template was removed by calcining at 550° C. for 12 h. The typical XRD pattern is given in Table 1. The ZSM-5 catalysts were synthesized with the autoclavation temperature 230–250° C. and the autoclavation time 4, 6 and 10 h and the XRD patterns are given in Table 1, Table 2 and Table 3 respectively. The experimental conditions for the synthesis of ZSM-5 with various solvents and high pressure conditions are given in Table 4. The experimental conditions corresponding to the synthesis of ZSM-5 catalysts at various autoclavation temperatures are given in Table 5.

EXAMPLE 1

This example 1 illustrates the synthesis of ZSM-5 using methanol and water as solvents. Sodium hydroxide of 0.88 g (0.22 mole), 1.05 g of sodium aluminate, 41.9 ml (0.1882 mole) of tetraethoxy silane, 196 ml (4.841 mole) of methanol and 15 g seeding gel as described earlier containing TPAOH were mixed thoroughly. The initial pH of mixture was ~10.2. The gel composition was as follows, $(SiO_2)_{29.4}$: $(Al_2O_3)_1$: $(Template)_{0.5}$: $(H_2O)_{260}$. The mixture was put in the Parr autoclave and heated at 242° C. for 4 h. Then the solid material was filtered, washed thoroughly and dried at 100–110° C. for 6 h. The organic template was removed by calcining at 550° C. for ~12 h. The XRD pattern is as given in Table 1. The crystallinity was>95%. The BET surface area was 361 $m^2.g^{-1}$.

EXAMPLE 2

The synthesis of ZSM-5 was carried out as discussed in Example 1, except that methanol is replaced by acetone as a solvent. The autoclavation was carried out at 230° C. and 47 atm autogeneous pressure for 10 h. The crystallinity was ~74% and the BET-$N_2$-surface area was 364 $m^2.g^{-1}$. The XRD pattern of this catalyst is given in Table 6.

EXAMPLE 3

The synthesis of ZSM-5 was carried out as discussed in Example 1 except that methanol was replaced by isopropanol as a solvent. The autoclavation was carried out at 230° C. and 48 atm autogeneous pressure for 10 h. The crystallinity was ~71% and the $N_2$ BET surface area was 346 $m^2.g^{-1}$. The XRD pattern of this catalyst is given in Table 7.

EXAMPLE 4

The synthesis of ZSM-5 was carried out as discussed in Example 1 except that methanol was replaced by ethanol as a solvent. The autoclavation was carried out at 233° C. and 50 atm autogeneous pressure for 10 h. The crystallinity was ~53% and BET surface area using nitrogen was 343 $m^2.g^{-1}$. The XRD pattern of this catalyst is given in Table 8.

EXAMPLE 5

The synthesis of ZSM-5 was carried out as discussed in Example 1 except that methanol was replaced by water as the only solvent. The autoclavation was carried out at 260° C. and 47 atm autogeneous pressure for 10 h. The crystallinity of the zeolite was ~83% and BET surface area using nitrogen was 379 $m^2 g^{-1}$. The XRD pattern of this ZSM-5 catalyst is given in Table 9.

EXAMPLE 6

The synthesis of ZSM-5 was carried out as discussed in Example 1 except that the autoclavation was carried out at 200° C. and 39 atm autogeneous pressure for 4 h. The crystallinity of the zeolite was ~94% and BET surface area using nitrogen was 358 $m^2.g^{-1}$. The XRD pattern of this ZSM-5 catalyst is given in Table 10.

TABLE 1

XRD pattern of ZSM-5 catalyst (solvent = $CH_3OH$, autoclavation time = 4 h)

| d, Interplaner spacing | Intensity ratio |
| --- | --- |
| 11.290 | 51.9 |
| 10.090 | 34.0 |
| 7.500 | 7.0 |
| 6.763 | 5.1 |
| 6.397 | 10.3 |
| 6.042 | 12.1 |
| 5.746 | 6.1 |
| 5.594 | 6.9 |
| 5.020 | 5.2 |
| 4.633 | 6.9 |
| 4.277 | 9.5 |
| 4.022 | 7.3 |
| 3.854 | 100.0 |
| 3.741 | 39.4 |
| 3.658 | 23.5 |
| 3.453 | 9.3 |
| 3.356 | 10.6 |
| 3.060 | 8.4 |
| 2.993 | 13.5 |
| 2.742 | 5.6 |
| 2.687 | 6.1 |
| 2.687 | 7.4 |
| 2.492 | 8.8 |
| 2.408 | 5.6 |

TABLE 2

XRD pattern of ZSM-5 (solvent = methanol, autoclavation time = 6 h)

| d, Interplaner spacing | Intensity ratio |
| --- | --- |
| 23.47 | 15.1 |
| 19.25 | 18.3 |
| 13.76 | 14.3 |
| 11.30 | 58.3 |
| 10.08 | 46.5 |
| 9.05 | 9.0 |
| 7.49 | 11.6 |
| 7.13 | 11.1 |
| 6.74 | 11.3 |
| 6.41 | 20.6 |
| 6.03 | 20.1 |
| 5.60 | 42.2 |
| 5.38 | 11.3 |
| 5.02 | 12.0 |
| 4.62 | 14.9 |
| 4.27 | 43.8 |
| 4.0 | 17.5 |
| 3.85 | 100.0 |
| 3.74 | 84.5 |
| 3.66 | 66.2 |
| 3.43 | 43.5 |
| 3.35 | 31.8 |
| 3.15 | 5.5 |
| 3.06 | 10.0 |
| 2.98 | 12.8 |
| 2.92 | 8.3 |
| 2.79 | 4.6 |
| 2.68 | 7.3 |
| 2.60 | 4.5 |
| 2.50 | 6.2 |
| 2.46 | 7.3 |
| 2.4 | 10.1 |

TABLE 3

XRD pattern of ZSM-5 (solvent = methanol, autoclavation time = 10 h)

| d, Interplaner spacing | Intensity ratio |
|---|---|
| 13.99 | 1.3 |
| 11.53 | 84.2 |
| 10.29 | 44.8 |
| 7.589 | 6.8 |
| 6.828 | 7.3 |
| 6.479 | 13.7 |
| 6.102 | 20.2 |
| 5.807 | 7.8 |
| 5.668 | 7.9 |
| 5.457 | 6.7 |
| 5.065 | 9.6 |
| 4.678 | 5.4 |
| 4.423 | 7.0 |
| 4.309 | 10.8 |
| 4.079 | 7.1 |
| 3.890 | 100.0 |
| 3.775 | 55.4 |
| 3.683 | 30.3 |
| 3.471 | 15.0 |
| 3.166 | 10.1 |
| 3.076 | 11.5 |
| 3.007 | 20.3 |
| 2.756 | 8.2 |
| 2.622 | 9.5 |
| 2.418 | 7.0 |
| 2.338 | 6.3 |

The experimental conditions for the synthesis of ZSM-5 are given the Table 4.

TABLE 6

XRD pattern of ZSM-5 (solvent = acetone, autoclavation time = 10 h)

| d, Interplaner spacing | Intensity ratio |
|---|---|
| 11.18 | 51.9 |
| 10.01 | 39.3 |
| 7.423 | 8.6 |
| 6.390 | 16.9 |
| 6.011 | 15.4 |
| 5.571 | 15.1 |
| 5.365 | 11.6 |
| 4.596 | 9.2 |
| 4.264 | 29.0 |
| 4.039 | 21.9 |
| 3.852 | 100.0 |
| 3.728 | 64.9 |
| 3.649 | 27.5 |
| 3.346 | 68.7 |
| 3.051 | 13.9 |
| 2.982 | 17.6 |
| 2.848 | 13.2 |
| 2.748 | 9.2 |
| 2.489 | 4.7 |
| 2.398 | 16.0 |

TABLE 4

Synthesis of ZSM-5 with various solvents and under high pressure conditions.

| Entry | Solvent | Gel Composition | Autoclavation Temperature (° C.) | Autogeneous Pressure (atm) | Time (h) | Initial pH | Final pH | Surface area (m² · g⁻¹) | % Crystallinity | (Si/Al) atomic zeolite |
|---|---|---|---|---|---|---|---|---|---|---|
| 1 | Methanol | R. (CH$_3$OH)$_{756}$ | 242 | 50 | 4 | 10.2 | 11.6 | 361 | 95.0 | 27.25 |
| | | | 242 | 49 | 6 | 10.2 | 11.6 | 351 | 83.0 | — |
| | | | 242 | 50 | 10 | 10.1 | 11.8 | 387 | 92.0 | — |
| 2 | Acetone | R. (CH$_3$COCH$_3$)$_{417}$ | 230 | 47 | 10 | 10.2 | 11.3 | 364 | 74.0 | 17.10 |
| 3 | Isopropanol | R. ((CH$_3$)$_2$CHOH)$_{400}$ | 230 | 48 | 10 | 10.3 | 11.4 | 346 | 71.0 | 17.63 |
| 4 | Ethanol | R. (CH$_3$CH$_2$OH)$_{525}$ | 233 | 50 | 10 | 10.3 | 11.6 | 343 | 53.0 | 17.63 |
| 5 | Acetonitrile | R. (CH$_3$CN)$_{586}$ | 265 | 50 | 10 | 10.0 | 11.2 | 333 | — | 16.43 |
| 6 | Water | R. (H$_2$O)$_{1701}$ | 260 | 47 | 10 | 10.4 | 11.6 | 379 | 83.0 | 13.85 |

R = (SiO$_2$)$_{29.4}$. (Al$_2$O$_3$)$_1$. (Templ)$_{0.5}$. (H$_2$O)$_{260}$

The autoclavation temperature and corresponding pressure was varied and given in Table 5.

TABLE 5

Synthesis of ZSM-5[a]: Effect of Temperature

| Entry | Autoclavation Temperature (° C.) | Autogeneous Pressure (atm) | Gel Composition | Time (h) | Initial pH | Final pH | Surface area (m² · g⁻¹) | % Crystallinity |
|---|---|---|---|---|---|---|---|---|
| 1. | 242 | 50 | R. (CH$_3$OH)$_{756}$ | 4 | 10.2 | 11.6 | 361 | 95.0 |
| 2. | 200 | 39 | " | 4 | 10.1 | 11.2 | 358 | 94.0 |
| 3. | 180 | 34 | " | 4 | 9.9 | 11.0 | 342 | 95.0 |
| 4. | 150 | 27 | " | 4 | 9.8 | 11.1 | 347 | 61.0 |

[a]Methanol used as a solvent
R = (SiO$_2$)$_{29.4}$. (Al$_2$O$_3$)$_1$. (Templ)$_{0.5}$. (H$_2$O)$_{260}$

TABLE 7

XRD pattern of ZSM-5 (solvent = isopropanol, autoclavation time = 10 h)

| d, Interplaner spacing | Intensity ratio |
|---|---|
| 28.12 | 9.3 |
| 22.59 | 6.9 |
| 17.96 | 5.8 |
| 13.66 | 5.4 |
| 11.06 | 63.3 |
| 9.869 | 37.7 |
| 8.812 | 6.7 |
| 7.414 | 6.4 |
| 6.666 | 5.6 |
| 6.325 | 5.2 |
| 5.946 | 12.8 |
| 5.675 | 11.3 |
| 5.557 | 7.4 |
| 5.334 | 5.7 |
| 4.978 | 11.7 |
| 4.591 | 8.7 |
| 4.352 | 7.4 |
| 4.240 | 33.2 |
| 4.022 | 12.2 |
| 3.830 | 100.0 |
| 3.714 | 50.2 |
| 3.630 | 25.5 |
| 3.468 | 7.4 |
| 3.424 | 9.7 |
| 3.332 | 72.4 |
| 3.321 | 6.1 |
| 3.126 | 4.3 |
| 3.044 | 11.2 |
| 2.971 | 14.6 |
| 2.863 | 6.9 |
| 2.729 | 5.2 |
| 2.669 | 5.1 |
| 2.568 | 5.6 |
| 2.453 | 11.6 |
| 2.276 | 9.3 |

TABLE 8

XRD pattern of ZSM-5 catalyst (solvent = ethanol, autoclavation time = 10 h)

| d, Interplaner spacing | Intensity ratio |
|---|---|
| 11.12 | 49.4 |
| 9.936 | 37.8 |
| 6.369 | 16.5 |
| 5.991 | 17.8 |
| 5.616 | 15.8 |
| 4.999 | 9.9 |
| 4.592 | 11.2 |
| 4.253 | 44.2 |
| 4.035 | 98.2 |
| 3.836 | 100.0 |
| 3.723 | 55.2 |
| 3.630 | 25.3 |
| 3.454 | 9.3 |
| 3.341 | 65.1 |
| 3.138 | 16.9 |
| 3.049 | 15.2 |
| 2.978 | 26.2 |
| 2.848 | 17.8 |
| 2.742 | 11.4 |
| 2.478 | 18.5 |

TABLE 9

XRD pattern of ZSM-5 catalyst (solvent = water, autoclavation time = 10 h)

| d, Interplaner spacing | Intensity ratio |
|---|---|
| 11.48 | 73.1 |
| 10.26 | 55.6 |
| 9.186 | 6.9 |
| 7.605 | 6.3 |
| 6.805 | 7.2 |
| 6.476 | 11.7 |
| 6.074 | 14.7 |
| 5.657 | 14.9 |
| 5.425 | 8.8 |
| 5.055 | 9.1 |
| 4.658 | 9.3 |
| 4.307 | 12.5 |
| 4.042 | 7.6 |
| 3.883 | 100.0 |
| 3.762 | 50.6 |
| 3.683 | 28.3 |
| 3.480 | 10.7 |
| 3.362 | 16.7 |
| 3.075 | 16.4 |
| 3.002 | 15.5 |
| 2.877 | 7.6 |
| 2.757 | 8.2 |
| 2.506 | 9.6 |
| 2.418 | 7.7 |
| 2.300 | 5.8 |
| 2.016 | 13.1 |
| 1.917 | 6.4 |
| 1.817 | 7.0 |

TABLE 10

XRD pattern of ZSM-5 catalyst (solvent = methanol, autoclavation temperature = 200° C.)

| d, Interplaner spacing | Intensity ratio |
|---|---|
| 32.51 | 4.9 |
| 21.67 | 5.2 |
| 16.15 | 5.1 |
| 11.52 | 66.0 |
| 10.31 | 43.4 |
| 9.209 | 4.9 |
| 7.605 | 10.5 |
| 7.234 | 9.6 |
| 6.862 | 8.2 |
| 6.495 | 8.3 |
| 6.097 | 20.0 |
| 5.815 | 8.2 |
| 5.656 | 17.8 |
| 4.668 | 7.9 |
| 4.413 | 7.2 |
| 4.318 | 9.3 |
| 4.055 | 6.8 |
| 3.880 | 100.0 |
| 3.793 | 28.3 |
| 3.756 | 55.5 |
| 3.689 | 33.4 |
| 3.467 | 8.5 |
| 3.339 | 8.2 |
| 3.000 | 9.7 |
| 3.005 | 12.1 |
| 2.629 | 9.6 |

We claim:

1. A process for the preparation of ZSM-5 catalyst of the formula 3.25 $Na_2O \cdot Al_2O_3 \cdot 30SiO_2 \cdot zH_2O$, where z=15–20 water molecules per unit cell, the process comprising autoclaving a mixture of a pre-prepared seeding gel comprising a mixture of an alkali metal cation, an alkali hydroxide, and a silica source in water, and further amounts of silica source and an aluminum source in the presence of an organic solvent near or above the super critical conditions of temperature and pressure for the organic solvent.

2. A process as claimed in claim 1 wherein the ZSM-5 catalyst has an x-ray diffraction pattern given in the table below:

| D, Interplaner spacing | Intensity ratio |
|---|---|
| 11.290 | 51.9 |
| 10.090 | 34.0 |
| 7.500 | 7.0 |
| 6.763 | 5.1 |
| 6.397 | 10.3 |
| 6.042 | 12.1 |
| 5.746 | 6.1 |
| 5.594 | 6.9 |
| 5.020 | 5.2 |
| 4.633 | 6.9 |
| 4.277 | 9.5 |
| 4.022 | 7.3 |
| 3.854 | 100.0 |
| 3.741 | 39.4 |
| 3.658 | 23.5 |
| 3.453 | 9.3 |
| 3.356 | 10.6 |
| 3.060 | 8.4 |
| 2.993 | 13.5 |
| 2.742 | 5.6 |
| 2.687 | 6.1 |
| 2.687 | 7.4 |
| 2.492 | 8.8 |
| 2.408 | 5.6. |

3. A process as claimed in claim 1 wherein the seeding gel comprises is sodium tetrapropylammonium hydroxide.

4. A process as claimed in claim 1 wherein the silica source comprises tetraethoxysilane.

5. A process as claimed in claim 1 wherein the aluminum source comprises sodium aluminate.

6. A process as claimed in claim 1 wherein the organic solvent used is selected from the group consisting of methanol, acetone, isopropanol, acetonitrile and ethanol.

7. A process as claimed in claim 6 wherein the autoclavation temperature is from 230° C. to 265° C., and the autoclavation pressure is from 47 atm to 50 atm.

8. A process as claimed in claim 7, wherein the autoclavation time is from 4 hr to 10 hr.

9. A process as claimed in claim 1 wherein water is used as a co-solvent along with the organic solvent.

10. A process as claimed in claim 1 wherein the autoclavation temperature is varied from 150 to 250° C., preferably under supercritical temperature of the organic solvent.

11. A process as claimed in claim 10 wherein the organic solvent is methanol and the autoclavation time is from 4 hr to 10 hr.

12. A process as claimed in claim 10 wherein the autoclavation temperature is above 200° C.

13. A process as claimed in claim 1 wherein the autoclavation pressure is varied from 20 to 50 atm near to subcritical and pressure of the organic solvent used.

14. A process as claimed in claim 1 wherein the Si/Al atomic ratio in the seeding gel is varied thereby controlling the Si/Al atomic ratio in the as-synthesized ZSM-5.

15. A process as claimed in claim 14 wherein the Si/Al ratio is varied in the range of 10 to 60.

16. A process as claimed in claim 1 wherein the organic template is removed by heating as-synthesized ZSM-5 at 550° C. for 12–16 hours.

* * * * *